United States Patent [19]
Abrishamkar et al.

[11] Patent Number: 6,134,278
[45] Date of Patent: Oct. 17, 2000

[54] METHODS AND APPARATUS FOR CDMA RATE DETECTION

[75] Inventors: Farrokh Abrishamkar, Middletown; Jaehyeong Kim, Pine Brook; Zulfiquar Sayeed, Plainsboro, all of N.J.

[73] Assignee: Lucent Technologies Inc., Murray Hill, N.J.

[21] Appl. No.: 09/016,675

[22] Filed: Jan. 30, 1998

[51] Int. Cl.[7] .............................. H03D 1/00; H04L 27/06; H04B 3/46; H04B 17/00; H04Q 1/20
[52] U.S. Cl. ..................... 375/341; 375/225; 375/262; 370/342; 370/479
[58] Field of Search .................... 375/341, 262, 375/225; 370/342, 479

[56] References Cited

U.S. PATENT DOCUMENTS

| | | | |
|---|---|---|---|
| 5,396,516 | 3/1995 | Padovani et al. | 375/225 |
| 5,619,524 | 4/1997 | Ling et al. | 375/130 |
| 5,671,255 | 9/1997 | Wang et al. | 375/341 |
| 5,757,850 | 5/1998 | Takaki | 375/225 |
| 5,771,226 | 6/1998 | Kaku | 370/232 |
| 5,796,757 | 8/1998 | Czaja | 714/789 |
| 5,878,098 | 3/1999 | Wang et al. | 375/377 |
| 5,883,923 | 3/1999 | Shimazaki | 375/225 |
| 5,978,414 | 11/1999 | Nara | 375/225 |

*Primary Examiner*—Stephen Chin
*Assistant Examiner*—Michael W. Maddox
*Attorney, Agent, or Firm*—Law Offices of Peter H. Priest

[57] ABSTRACT

Techniques for more accurately detecting the data rate of a frame of data in a cellular telephone system are described. Data is preferably received at one of four rates: full, half, quarter and eighth. A correlation is performed between the incoming soft data and the data generated by re-encoding and re-repeating the data. Variations on the approach make it readily possible to accurately perform rateset 1 or rateset 2 rate detection.

11 Claims, 5 Drawing Sheets

METHODS AND APPARATUS FOR CDMA RATE DETECTION

FIELD OF THE INVENTION

The present invention relates generally to cellular telephony. More particularly, the present invention relates to methods and apparatus for the detection of data rates of incoming frames of data in a cellular telephone system.

BACKGROUND OF THE INVENTION

In CDMA communications, accurate detection of the data rate of the data in the channel is critical to proper transmission of data. Proper transmission and accurate reception of data in voice communications is in turn critical to acceptable sound quality. In CDMA standards IS-95 and J-STD-8 the data rate of the traffic channel can be one of four rates: full, half, quarter and eighth. The rate is selected by the vocoder depending on the voice activity factor. To reproduce the encoded and transmitted speech at the mobile station, the rate of the incoming frame must be determined precisely. Inaccurate rate detection results in annoying audible 'pops' and 'squeaks' and additionally in an increased frame error rate which is a critical measure of quality of a handset.

A previous rate detection method exists, I. Cohen and H. Lou "Multi-rate detection for IS-95 CDMA forward traffic channels" IEEE Globecom '95, November 1995 ("Cohen"). In Cohen, likelihood numbers are obtained by the absolute values of the sums of groups of the soft de-interleaved data, and then using thresholding methods to obtain the most likely rate of the incoming frame. Simulation of the Cohen method has been conducted and it has been determined that Cohen does not yield the desired performance.

A need exists in the art for high-performance rate detection methods and apparatus suitable for use with IS-95 and J-STD-8 CDMA traffic channels, which will precisely determine the rate of an incoming frame of data.

SUMMARY OF THE INVENTION

To this end, one aspect of the present invention performs a correlation between soft data in an input stream to a Viterbi decoder and the data generated by reencoding and re-repeating the data after decoding by the Viterbi decoder. Correlation is performed for the possible four rates and a decision is made as to which rate is the most likely one based on the correlation values.

The correlations are approximately true correlations in the statistical sense, although no explicit normalization is performed. Normalization is avoided since the data entering the correlation are scaled and 'normalized' numbers making implementation of the rate detection system easier and more likely to be adopted as a realistic solution. In addition, the scaling is inherently necessary for the fixed-point Viterbi decoder, and hence, the normalized input is available free of cost.

The symbol error rate is preferably calculated as follows:

Let $\{y_i\}$ be the input sequence of a Viterbi decoder, and let $\{c_i\}$ be the sequence of convolutionally re-encoded binary value. Then the normalized correlation corr is $$\mathrm{corr} = (\Sigma_{i=1}^{L(\mathrm{rate})} y_i b_i) / (\Sigma_{i=1}^{L(\mathrm{rate})} |y_i b_i|)$$

where $b_i = 2c_i - 1$ $L(\mathrm{rate})$ is the number of symbols per frame after de-repetition. In rateset 1 of IS-95, or J-STD-8, $L(\mathrm{full}) = 384$, $L(\mathrm{half}) = 192$, $L(\mathrm{quart}) = 96$, $L(\mathrm{eight}) = 48$.

In the implementation, $y_i$'s are quantized before the Viterbi decoder. In the quantization scheme, $E[|y_i|]$ is mapped into a certain level K. $E[|y_i|]$ is the average absolute value of $y_i$ in one frame. The normalized correlation after N bit quantization $\mathrm{corr}Q_N$ is $$\mathrm{corr}Q_N = (\Sigma_{i=1}^{L(\mathrm{rate})} Q_N(y_i) b_i) / (\Sigma_{i=1}^{L(\mathrm{rate})} |Q_N(y_i)|)$$

When $N=1$, $\mathrm{corr}Q_N$ is called hard SER (symbol error rate), whose denominator is always $L(\mathrm{rate})$. When N is larger than 1, $\mathrm{corr}Q_N$ is called soft SER, whose denominator can be approximated as:

$$\Sigma_{i=1}^{L(\mathrm{rate})} |Q_N(y_i)| \approx \alpha \Sigma_{i=1}^{L(\mathrm{rate})} |y_i| = (K/E[|y_i|]) \times L(\mathrm{rate}) \times E|y_i| = KL(\mathrm{rate})$$

where $\alpha = K/E[|y_i|]$.

Thus, in both hard and soft SER, there is no need to calculate the denominator because they are constants. Soft SER shows better performance than hard SER.

A more complete understanding of the present invention, as well as further features and advantages of the invention, will be apparent from the following Detailed Description and the accompanying drawings.

DETAILED DESCRIPTION

Figure 1:
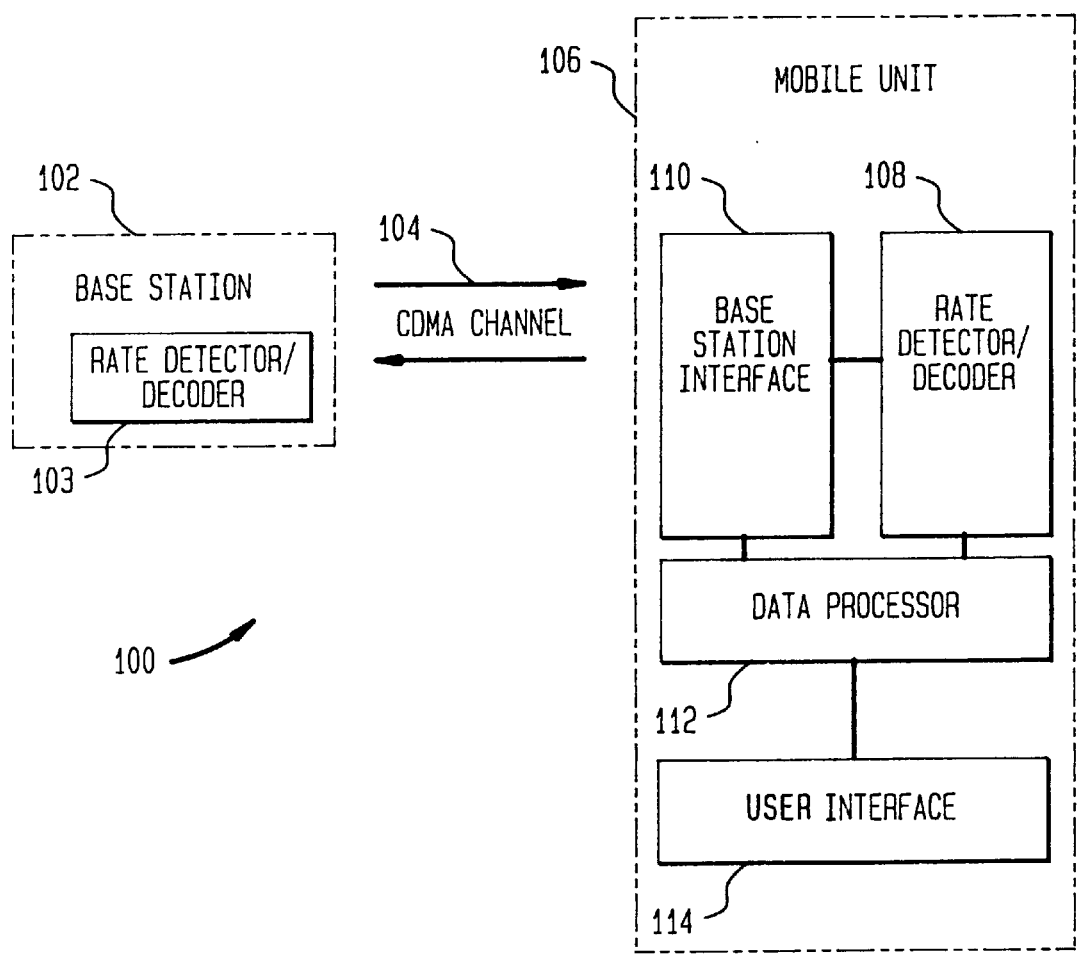
FIG. 1 illustrates a cellular telephone system using a rate detector according to an aspect of the present invention.

FIG. 1 illustrates a portion of a cellular telephone system 100 including a base station 102 communicating over a CDMA channel 104 with a mobile unit 106. It will be recognized that a plurality of base stations and many mobile units may suitably be employed although only one base station and one mobile unit are shown in FIG. 1 for the sake of simplifying the illustration. The mobile unit 106 includes a rate detector/decoder 108 according to the teachings of the present invention. The base station 102 also preferably includes a rate detector/decoder 103. The rate detector/decoder 103 of the base station 102 may operate in a fashion consistent with the existing state of the art, or it may be possible to have it operate in a manner similar to that of the rate detector/decoder 108 of the mobile unit 106 coupled to the different coding rate.

The base station 102 preferably transmits information over the CDMA channel 104 at one of four rates: full, half, quarter and eighth, depending on the voice activity factor. The data is transmitted to the mobile unit 106 in frames, and the mobile unit 106 uses the rate detector/decoder 108 to determine the data rate of each frame in order to provide good audio quality.

Mobile unit 102 also includes a base station interface 110 and a data processor 112. The base station interface 110 relays data received from the mobile unit 102 to the rate detector/decoder 108, which analyzes the data received to determine the data rate. The base station interface 110 also relays the data to the data processor 112, which also receives the decoded data, as well as rate information, from the rate detector/decoder 108. The data processor 112 processes the data received from the base station interface 110 and provides the data to a user interface 114, which handles the processed data appropriately, usually by providing sound or data output.

Figure 2:
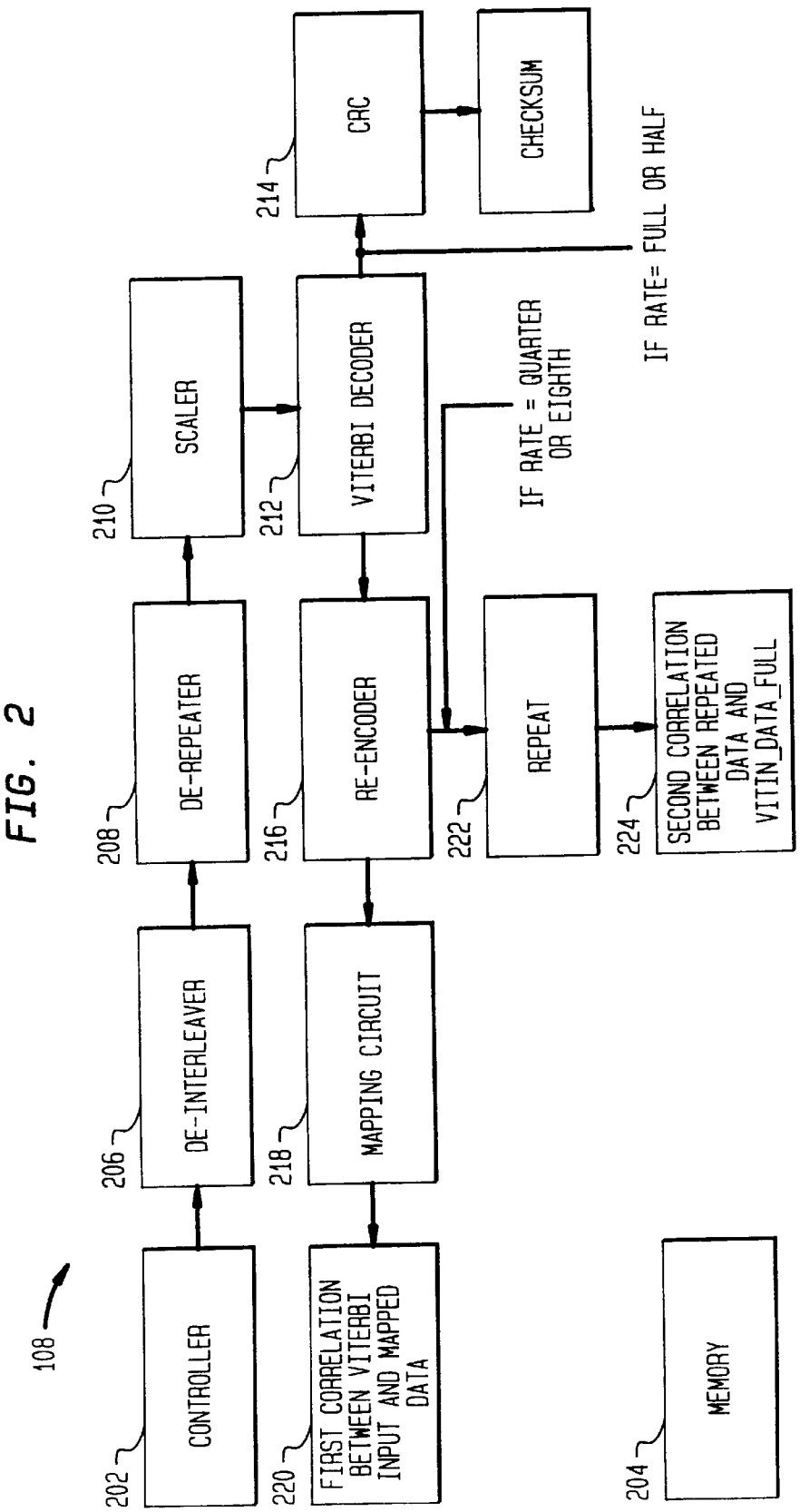
FIG. 2 illustrates further details of the rate detector/decoder of FIG. 1.

FIG. 2 illustrates the rate detector/decoder 108 of FIG. 1 in greater detail. Rate detector/decoder 108 may be suitably employed for rateset 1 rate detection. With a different algorithm rateset 2 detection may be performed. The rateset 1 algorithm is discussed in connection with FIG. 2 while the rateset 2 algorithm is discussed in connection with FIG. 3. Rate detector/decoder 108 receives a frame of data symbols from the base station interface 110. Rate detector/decoder 108 includes a controller 202. Controller 202 preferably runs rate detector/decoder 108 through four computational iterations for each frame of incoming data. The computational iterations are for assumed rates of full, half, quarter and eighth in that order. Controller 202 represents the assumed rates by setting a variable "rate" to one of the values 0, 1, 2 or 3, depending on whether the assumed rate is full, half, quarter or eighth. Rate detector/decoder also includes memory 204 for storing values produced in the rate computation process. After running all of the iterations, controller 202 then directs the determination of the CDMA channel rate from information processed and stored during the four computational iterations.

The rate detector/decoder 108 includes a de-interleaver 206, which receives the data symbols and passes M soft bits to a de-repeater 208. The de-repeater 208 passes the data bits to a scaler 210, which passes M, M/2, M/4 or M/8 bits to a Viterbi decoder 212 depending on whether the rate of the data in the CDMA channel 104 is full, half, quarter or eighth. If the assumed rate is set to full, the scaled data is saved to the variable vitin_data_full.

The Viterbi decoder 212 decodes the bits received from the scaler 210 and passes out M/2, M/4, M/8 or M/16 depending on the CDMA channel rate. When the assumed rate is set to full or half, the bits are passed to CRC circuit 214 and a checksum is calculated and stored as checksum [rate]; that is, checksum[0] or checksum[1]. The Viterbi decoder 212 also passes the bits to a re-encoder 216. The re-encoder 216 re-encodes the bits into symbols and passes out M, M/2, M/4 or M/8 bits depending on the CDMA channel rate. The bits are passed into a mapping circuit 218, which maps "1"s to "1" and "0"s to "−1". The mapped bits are then passed to a first correlation circuit 220, which computes a first correlation value using the function:

$$\text{corr1}[rate] = \text{scale}(rate) * \Sigma_{i=0}^{M} \text{vitin\_data}(i) * \text{reencode}(i).$$

The variable scale(rate) is 1, 2, 4 or 8, depending on whether the assumed rate is 0, 1, 2 or 3, respectively.

When the assumed rate is set to quarter or eighth, the hard bits produced by the re-encoder 216 are passed to a repeat function circuit 222, which subjects the bits to a repeat function and passes the bits to a second correlation circuit 224 which computes a second correlation value using the function:

$$\text{corr2}[rate] = \Sigma_{i=0}^{M} \text{vitin\_data\_full}(i) * \text{repeat}(i).$$

After the first or first and second correlation values are computed, the controller 202 increments the variable "rate" and evaluates it to determine if it is equal to 4. A value of 4 is out of range and indicates that all the possible CDMA channel rates have been evaluated. If the variable "rate" is not equal to 4, the controller reinitiates the process of evaluating the data frame rate, with the assumed rate set to the incremented value, and the process of rate evaluation is repeated.

If the variable "rate" is equal to 4, the controller 202 evaluates the first and second correlation value arrays to determine the CDMA channel rate as follows:

if (corr1[0]≧corr1[1]) AND (corr1[0]≧corr1[2]) AND (corr1[0]≧corr1[3]) AND cksum[0]=0)) THEN detected_rate=0;

else if ((cksum[0]=0) AND corr1[0]≧THRSH1)) THEN detected_rate=0;

else if (corr1[1]≧corr1[0]) AND (corr1[1]≧corr1[2]) AND (corr1[1]≧corr1[3]) AND cksum[1]=0)) THEN detected_rate=1;

else if (corr1[2]≧corr1[0]) AND (corr1[2]≧corr1[1]) AND (corr1[2]≧corr1[3]+ADJ1) AND (corr1[2]≧THRSH2 AND corr2[2]≧THRSH3)) THEN detected_rate=2;

else if (corr1[3]+ADJ2≧corr1[0]) AND (corr1[3]+ADJ3≧corr1[1]) AND (corr1[3]+ADJ4≧corr1[2]) AND (corr1[3]≧THRSH4) AND (corr2[3]≧THRSH5)) THEN detected_rate=3;

If none of the above conditions is met, the rate detector/decoder 108 reports that the frame of data is bad.

Figure 3:
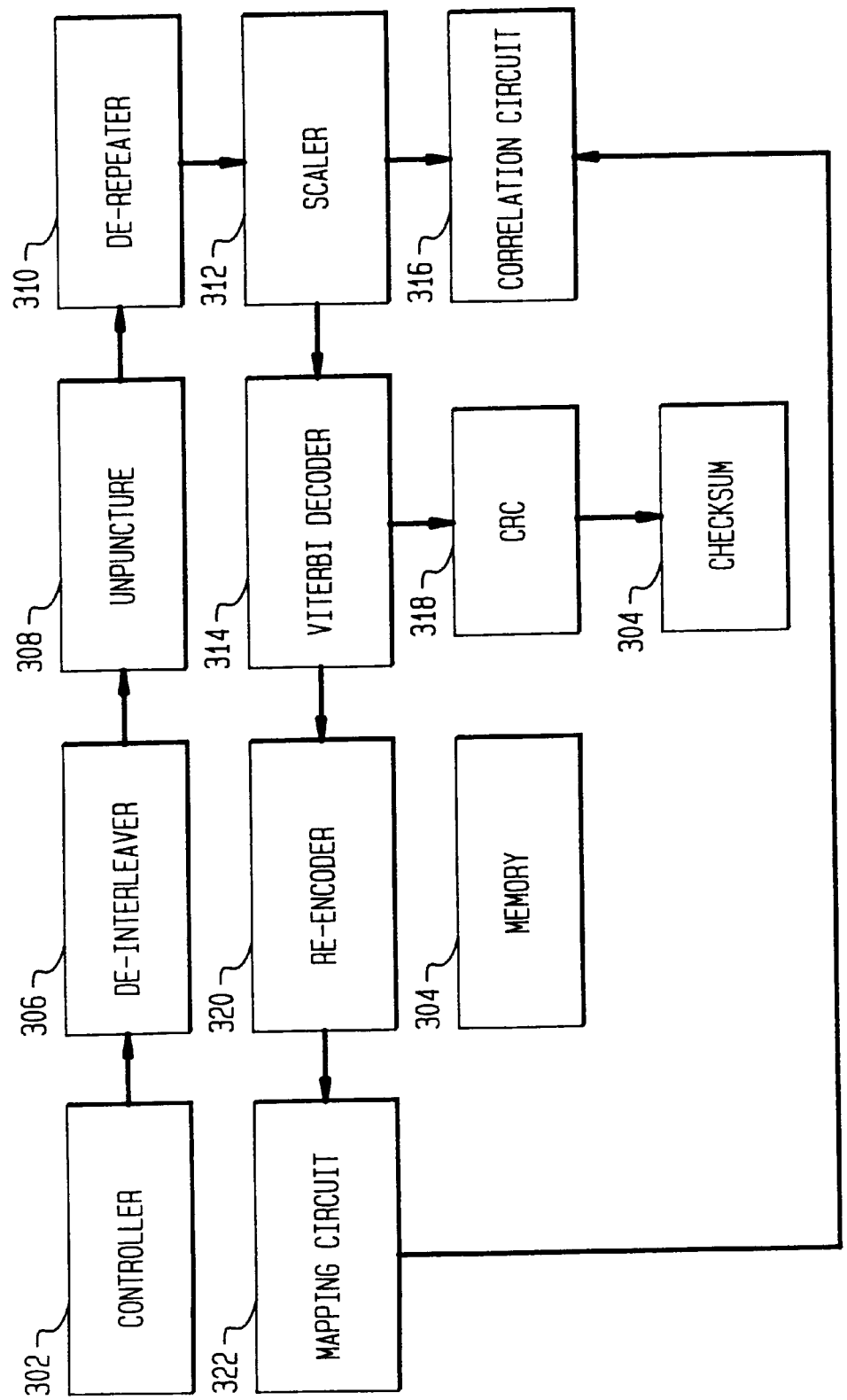
FIG. 3 illustrates a rate detector/decoder according to another aspect of the present invention.

FIG. 3 illustrates an alternative rate detector/decoder 300 according to an alternative aspect of the invention for rateset 2 detection. Rate detector/decoder 300 may suitably be employed in cellular telephone system 100 in place of the rate detector/decoder 108. Rateset 2 rate detection is desired.

Rate detector/decoder 300 includes a controller 302 which directs the operation of rate/detector 300. Controller 302 preferably runs rate detector/decoder 300 through four computational iterations for each frame of incoming data. The computational iterations are for assumed rates of 0, 1, 2 and 3 in that order. Controller 302 then directs the determination of the CDMA channel rate from information processed and stored during the four computational iterations. Rate detector/decoder 300 also includes memory 304 for storing information produced during the rate detection process.

Rate detector/decoder 300 includes de-interleaver 306, which receives each data frame from base station interface 110 and processes the data frame into 384 soft bits. The 384 soft bits are then passed to unpuncture circuit 308, which processes the bits into 576 soft bits. Unpuncture circuit 308 passes 576 soft bits to de-repeater 310. Depending on whether the assumed rate is 0, 1, 2 or 3, de-repeater 310 passes 576, 288, 144 or 72 soft bits to scaler 312. Scaler 312 scales the data to N bits, and, depending on whether the assumed rate is 0, 1, 2 or 3, passes 576, 288,144 or 72 soft bits (N bits wide) to Viterbi decoder 314 and correlation circuit 316. The Viterbi decoder 314 decodes the data and, depending on whether the assumed rate is 0, 1, 2, or 3, passes 288, 144, 72 or 36 hard bits to a CRC circuit 318. The CRC circuit 318 computes an array of checksum values and stores them in the variable array cksum[rate], one element of the array being computed during each computational iteration of the rate detector/decoder 300.

The Viterbi decoder also passes the 288, 144, 72 or 36 hard bits to a re-encoder 320, which produces 576, 288, 144 or 72 hard bits depending on whether the assumed rate is 0, 1, 2 or 3. The data is then transmitted to a mapping circuit 322, which maps "1's" to "1's" and "0's" to "−1's". The mapping circuit then passes the mapped bits to the correlation circuit 316. The correlation circuit 316 computes values for the variable array corr1[rate] as follows:

$$\text{corr1}[rate] = \text{scale}[rate] * \Sigma_{i=0}^{length(rate)} \text{vitin\_data}(i) * \text{reencoded}(i).$$

The variable scale[rate] takes on the values of 1.33, 2, 4 or 8, depending on whether the rate is 0, 1, 2 or 3.

After all iterations of the rate detection process are completed, the controller 302 determines the rate of the data frame according to the following criteria:

if (corr1[0]+ADJ1≧corr1[1]) AND (corr1[0]+ADJ2≧corr1[2]) AND (corr1[0]+ADJ3≧corr1[3]) AND cksum[0]=0)) THEN detected_rate=0;

else if (corr1[1]≧corr1[0]) AND (corr1[1]+ADJ4≧corr1[2]) AND (corr1[1]+ADJ5≧corr1[3]) AND cksum[1]=0)) THEN detected_rate=1;

else if (corr1[2]+ADJ6≧corr1[0]) AND (corr1[2]+ADJ7≧corr1[1]) AND (corr1[2]+ADJ8>corr1[3] AND (cksum[2]=0) THEN detected_rate=2;

else if (corr1[3]+ADJ9≧corr1[0]) AND (corr1[3]+ADJ10≧corr1[1]) AND (corr1[3]+ADJ11≧corr1[2]) AND (cksum[3]=0) THEN detected_rate=3;

If none of the above conditions is met, the rate detector/decoder reports that the frame of data is bad.

Figure 4:
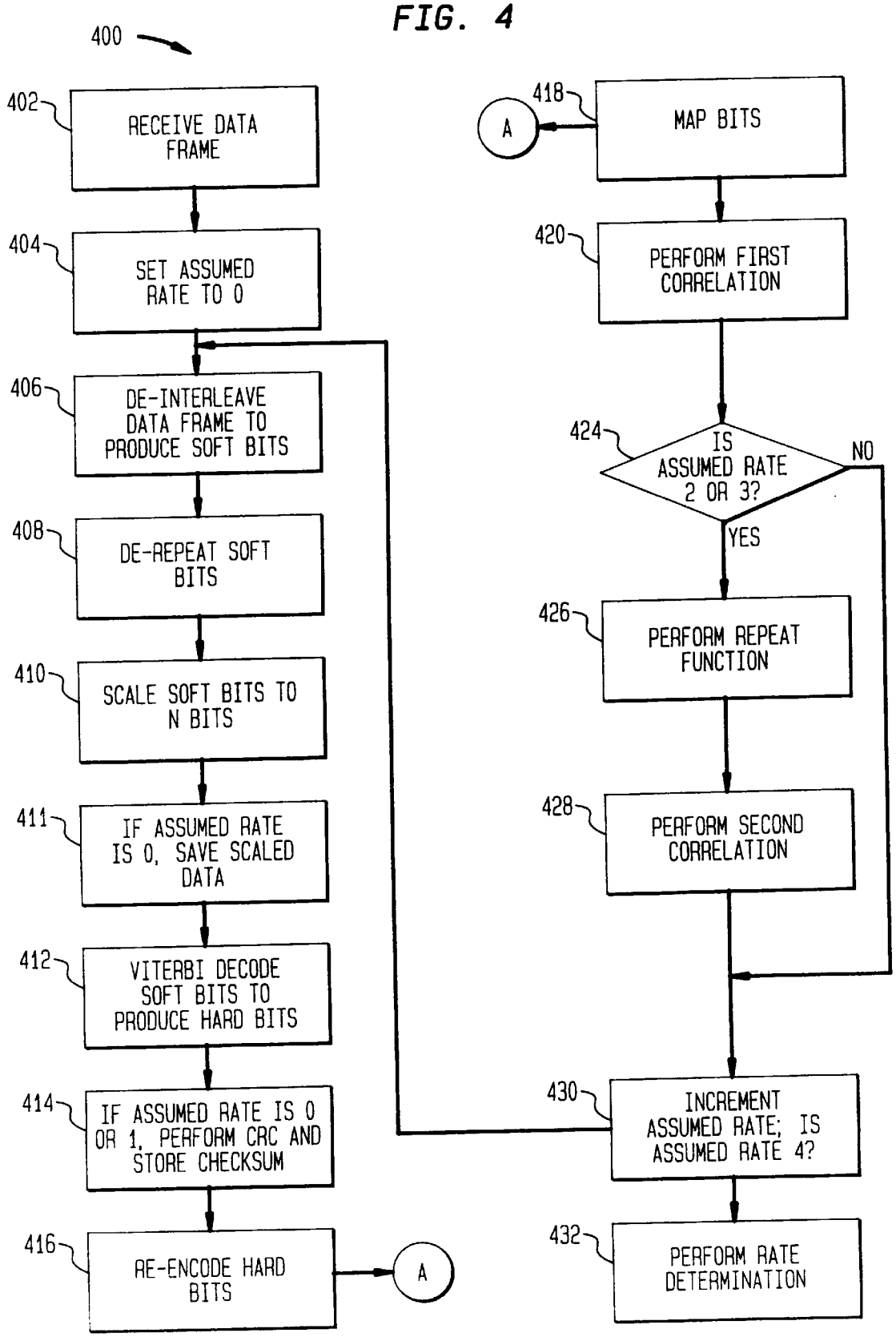
FIG. 4 is a flowchart illustrating the steps of a method of rate detection according to a further aspect of the present invention.

FIG. 4 is a flowchart illustrating a method of rate detection 400 according to one aspect of the present invention. Rateset 1 detection is illustrated. At step 402, a data frame is received. At step 404, the assumed rate is set to 0, representing full. At step 406, the data frame is de-interleaved, producing M soft bits. At step 408, the M soft bits are de-repeated. At step 410, the soft bits are scaled to N bits, producing M, M/2, M/4 or M/8 soft bits depending on whether the assumed rate is 0, 1, 2 or 3, representing full, half, quarter or eighth, respectively. At step 411, if the assumed rate is 0, scaled data is saved to the variable vitin_data_full. At step 412, the soft bits are Viterbi decoded, producing M/2, M/4, M/8 or M/16 hard bits, depending on whether the assumed rate is 0, 1, 2 or 3. If the assumed rate is 0 or 1, At step 414, the assumed rate is examined to determine if it is 0 or 1. If the assumed rate is 0 or 1, the hard bits are subjected to a CRC process, producing a checksum value associated with the rate assumption. The checksum value is stored and control is passed to step 416. At step 416, the hard bits are re-encoded to produce M, M/2, M/4 or M/8 hard bits depending on whether the assumed rate is 0, 1, 2 or 3. At step 418, the bits produced by the re-encoding are mapped, the "1's" mapped to "1's" and the "0's" mapped to "−1's". At step 420, the mapped bits and the soft bits produced by scaling are subjected to a first correlation as follows:

corr1[rate]=scale(rate)*$\Sigma_{i=0}^{M}$vitin_data(i)*reencode(i).

The variable scale(rate) is 1, 2, 4 or 8, depending on whether the assumed rate is 0, 1, 2 or 3, respectively.

At step 424, the assumed rate is examined. If the assumed rate is 2 or 3, control is passed to step 426. If the assumed rate is not 2 or 3, control is passed to step 430.

At step 426, a repeat function is performed. At step 428, the data produced by the repeat function and the scaled data stored as vitin_data_full are subjected to a correlation as follows:

corr2[rate]=$\Sigma_{i=0}^{M}$vitin data_full(i)*repeat(i).

Control is then passed to step 430.

At step 430, the assumed rate is incremented and checked to determined if the assumed rate is 4. If the assumed rate is not 4, control is passed to step 406. If the assumed rate is 4, control is passed to step 432 and the rate of the data frame is determined according to the following criteria:

if (corr1[0]≧corr1[1]) AND (corr1[0]≧corr1[2]) AND (corr1[0]>corr1[3]) AND cksum[0]=0)) THEN detected_rate=0;

else if ((cksum[0]=0) AND corr1[0]≧THRSH1)) THEN detected_rate=0;

else if (corr1[1]≧corr1[0]) AND (corr1[1]≧corr1[2]) AND (corr1[1]≧corr1[3]) AND cksum[1]=0)) THEN detected_rate=1;

else if (corr1[2]≧corr1[0]) AND (corr1[2]≧corr1[1]) AND (corr1[2]≧corr1[3]+ADJ1) AND (corr1[2]≧THRSH2 AND corr2[2]≧THRSH3)) THEN detected_rate=2;

else if (corr1[3]+ADJ2≧corr1[0]) AND (corr1[3]+ADJ3≧corr1[1]) AND (corr1[3]+ADJ4≧corr1[2]) AND (corr1[3]≧THRSH4) AND (corr2[3]≧THRSH5)) THEN detected_rate=3.

If none of these conditions is met, the rate detector/decoder reports that the frame of data is bad.

Figure 5:
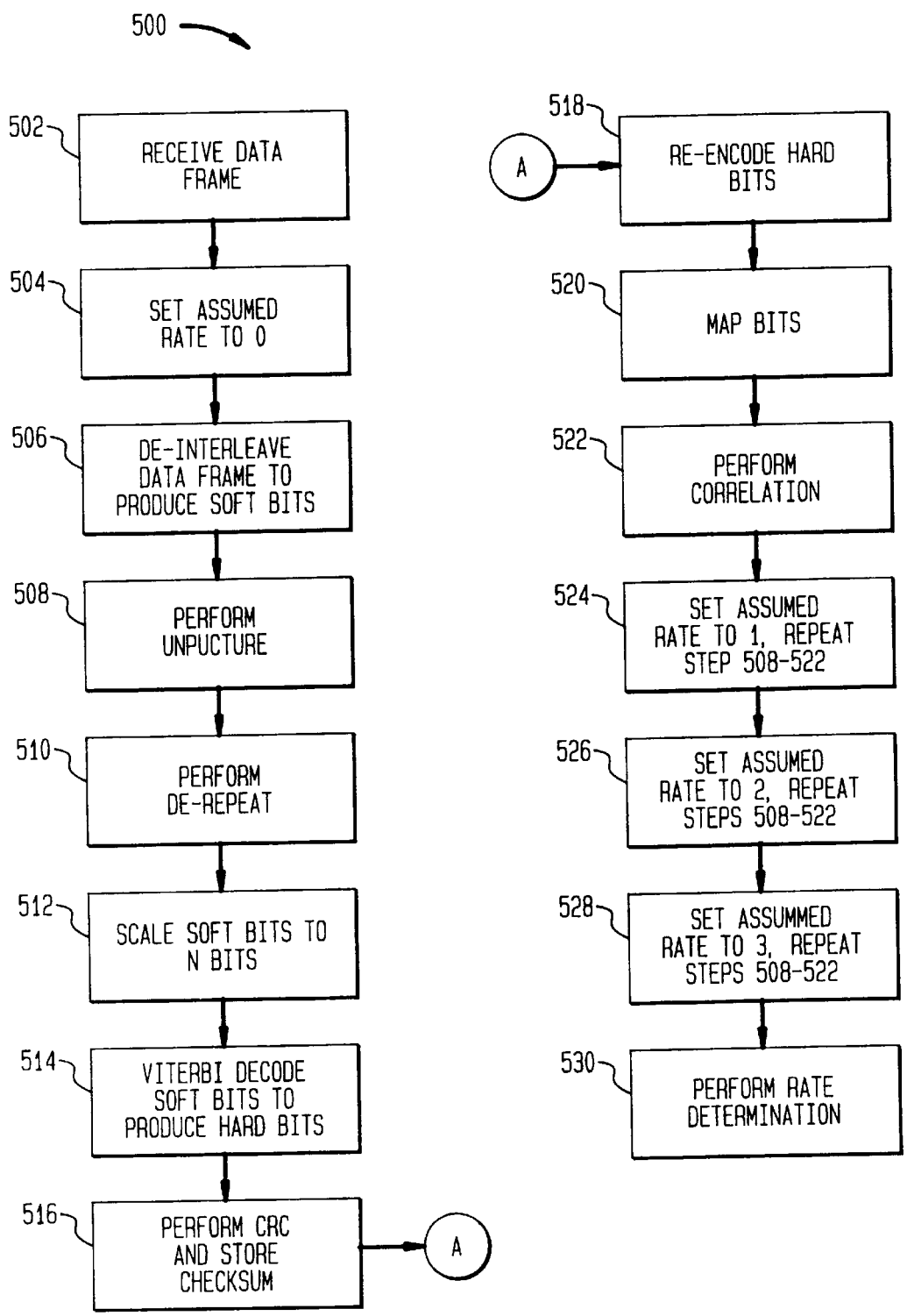
FIG. 5 is a flowchart illustrating the steps of a method of rate detection according to another aspect of the present invention.

FIG. 5 is a flowchart illustrating the steps of an alternative method of rate detection 500 according to an alternative aspect of the present invention. Rateset 2 detection is illustrated. At step 502, a frame of data is received. At step 504, the assumed rate is set to 0, representing full. The possible rates are 0, 1, 2 and 3, representing full, half, quarter and eighth, respectively. At step 506, the data frame is de-interleaved, producing 384 soft bits. At step 508, an unpuncture operation is performed, producing 576 soft bits. At step 510, a de-repeat is performed, producing 576, 288, 144 or 72 soft bits depending on whether the assumed rate is 0,1, 2 or 3, respectively. At step 512, the soft bits are scaled to N bits, producing 576, 288, 144 or 72 soft bits (N bits wide) depending on whether the assumed rate is 0, 1, 2 or 3, respectively. At step 514, the soft bits are Viterbi decoded, producing 288, 144, 72 or 36 hard bits, depending on whether the assumed rate is 0, 1, 2 or 3, respectively. At step 516, a CRC function is performed to produce a checksum associated with the assumed rate, which is stored as cksum[rate]. At step 518, a Re-encode is performed to produce 576, 288, 144 or 72 hard bits, depending on whether the assumed rate is 0, 1, 2 or 3, respectively. At step 520 a mapping is performed, with "1's" being mapped to "1's" and "0's" being mapped to "−1's". At step 522, a correlation is performed between the soft bits produced by the scaling at step 512 and the mapped bits produced at step 520, as follows:

corr1[rate]=scale(rate)*$\Sigma_{i=0}^{length(rate)}$vitin_data(i)*reencoded(i).

The value scale(rate) is 1.33, 2, 4 or 8, depending on whether the assumed rate is 0, 1, 2 or 3, respectively.

At step 524, the assumed rate is set to 1, and steps 508 through 522 are repeated. At step 526, the assumed rate is set to 2, and steps 508 through 522 are repeated. At step 528, the assumed rate is set to 3, and steps 508 through 522 are repeated.

At step 530, the data rate is determined according to the following criteria:

if (corr1[0]+ADJ1≧corr1[1]) AND (corr1[0]+ADJ2≧corr1[2]) AND (corr1[0]+ADJ3>corr1[3]) AND cksum[0]=0)) THEN detected_rate=0;

else if (corr1[1]≧corr1[0]) AND (corr1[1]+ADJ4≧corr1[2]) AND (corr1[1]+ADJ5≧corr1[3]) AND cksum[1]=0)) THEN detected_rate=1; else if (corr1[2]+ADJ6≧corr1[0]) AND (corr1[2]+ADJ7≧corr1[1]) AND (corr1[2]+ADJ8≧corr1[3] AND (cksum[2]=0) THEN detected_rate=2;

else if (corr1[3]+ADJ9≧corr1[0]) AND (corr1[3]+ADJ10>corr1[1]) AND (corr1[3]+ADJ11≧corr1[2]) AND (cksum[3]=0) THEN detected_rate=3.

If none of these conditions is met, the rate detector/decoder reports that the frame of data is bad.

While the present invention is disclosed in the context of a presently preferred embodiment, it will be recognized that a wide variety of implementations may be employed by persons of ordinary skill in the art consistent with the above discussion and the claims which follow below.

We claim:

1. A data rate detection system for detecting the rate of a frame of data received from a cellular telephone system, comprising:

an interface for receiving one or more frames of soft data;

a controller for successively assuming each of a plurality of data rates for the data and directing an iteration of processing of the soft data for each of the data rates;

a de-repeater for de-repeating the soft data to produce de-repeated soft data;

a scaler for scaling the de-repeated soft data to produce scaled soft data;

a Viterbi decoder for decoding the scaled soft data to produce decoded hard data;

a re-encoder for re-encoding the hard data to produce re-encoded hard data; and one or more correlation circuits for performing a correlation between the scaled soft data and the re-encoded hard data, each of the correlation circuits storing correlation data during each iteration for retrieval by the controller after the final iteration, the controller being operative, after the final iteration, to retrieve and evaluate the correlation data and to determine the rate of the frame of cellular telephone data frame depending on the correlation data.

2. The detector of claim 1, wherein the controller directs successive iterations with assumed rates of full, half, quarter and eighth.

3. The detector of claim 2 further comprising a CRC circuit for performing a CRC function on the hard data to produce a checksum, the CRC circuit being operative during iterations in which the assumed rate is set to full or half.

4. The detector of claim 3 further comprising a mapping circuit for mapping the re-encoded hard data to produce mapped hard data and supplying the mapped hard data to said one or more a correlation circuits.

5. The detector of claim 4, wherein the mapping circuit supplies the mapped hard data to a first correlation circuit.

6. The detector of claim 5, further comprising a second correlation circuit.

7. The detector of claim 6, further comprising a repeat circuit for receiving and repeating the re-encoded hard data to produce repeated hard data and supplying the repeated hard data to the second correlation circuit, the repeat circuit being operative during iterations in which the assumed rate is quarter or eighth.

8. The detector of claim 7, wherein the second correlation circuit also receives scaled data during iterations in which the assumed rate is full.

9. A data rate detection system for detecting the rate of a frame of data received from a cellular telephone system, comprising:

an interface for receiving one or more frames of soft data;

a controller for successively setting each of a plurality of assumed data rates for the data, the data rates being full, half, quarter and eighth, successively, and directing an iteration of processing of the soft data for each of the data rates;

a de-interleaver for de-interleaving the soft data to produce de-interleaved soft data;

an un-puncture circuit for receiving the de-interleaved soft data and producing un-punctured soft data;

a de-repeat circuit for de-repeating the un-punctured soft data to produce de-repeated soft data;

a scaler for scaling the de-repeated soft data to produce scaled soft data;

a Viterbi decoder for decoding the scaled soft data to produce decoded hard data;

a CRC circuit for performing a CRC function on the decoded hard data to produce a checksum;

a re-encoder for re-encoding the decoded hard data to produce re-encoded hard data;

a map circuit for mapping the re-encoded hard data to produce mapped hard data; and a correlation circuit for performing a correlation between the scaled soft bits and the mapped hard data, the correlation circuit producing correlation data, the correlation circuit providing the correlation data to the controller after the end of the final iteration, the controller being operative to evaluate the correlation data and determine a rate of the soft cellular telephone data.

10. A method of detection of a rate of a frame of cellular telephone data, the data having a rate of full, half, quarter or eighth, comprising the steps of:

a) receiving the frame of data;

b) setting an assumed rate of full;

c) de-interleaving the frame of data to produce soft bits;

d) de-repeating the soft bits;

e) scaling the soft bits to produce scaled soft bits;

f) Viterbi decoding the soft bits to produce hard bits;

g) if the assumed rate is full or half, performing a CRC function on the hard bits to produce a checksum;

h) re-encoding the hard bits to produce re-encoded hard bits;

i) mapping the re-encoded hard bits to produce mapped hard bits;

j) performing a first correlation between the mapped hard bits and the scaled soft bits to produce first correlation data;

k) if the assumed rate is not quarter or eighth, skipping to step n;

l) performing a repeat function on the re-encoded hard bits to produce repeated hard bits;

m) performing a second correlation between the re-encoded hard bits and the scaled soft bits to produce second correlation data;

n) incrementing the assumed rate and repeating steps c) through n) if the incremented rate is a valid rate; and o) determining the rate of the data frame based on the first and second correlation data.

11. A method of detection of a rate of a frame of cellular telephone data, the data having a rate of full, half, quarter or eighth, comprising the steps of:

a) receiving the data frame;

b) setting an assumed rate of full;

c) de-interleaving the data frame to produce soft bits;

d) performing an unpuncture on the soft bits to produce unpunctured bits;

e) performing a de-repeat on the unpunctured bits to produce de-repeated soft bits;

f) scaling the de-repeated soft bits to produce scaled soft bits;

g) Viterbi decoding the scaled soft bits to produce decoded hard bits;

h) if the assumed rate is full or half, performing a CRC function on the decoded hard bits to produce a checksum;

i) re-encoding the hard bits to produce re-encoded hard bits;

j) mapping the re-encoded hard bits to produce mapped hard bits;

k) performing a correlation between the scaled soft bits and the re-encoded hard bits to produce correlation data;

l) setting the assumed rate to half and repeating steps c through k;

m) setting the assumed rate to quarter and repeating steps c through k;

n) setting the assumed rate to eighth and repeating steps c through k; and o) determining the rate of the data frame based on the correlation data.

* * * * *